Nov. 7, 1967 L. S. JUE ETAL 3,350,786
APPARATUS FOR DETERMINING CIRCULARITY OF LARGE DIAMETER OBJECTS
Filed Nov. 4, 1965
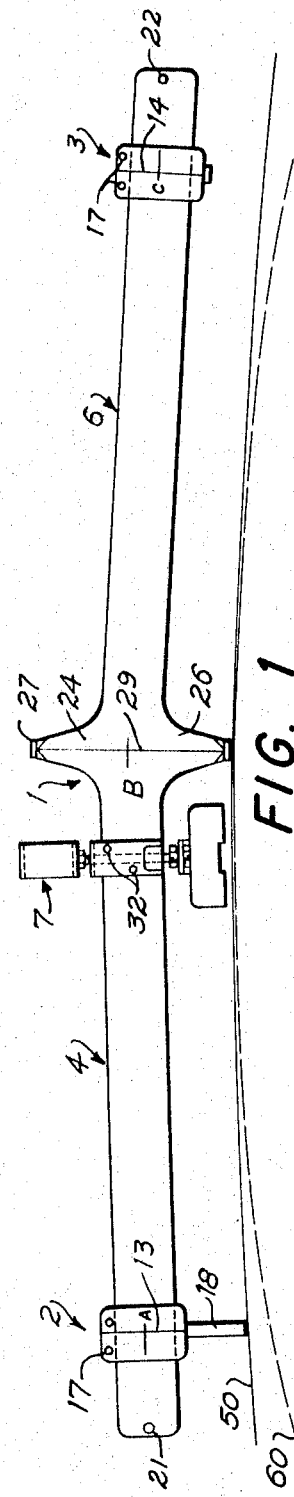
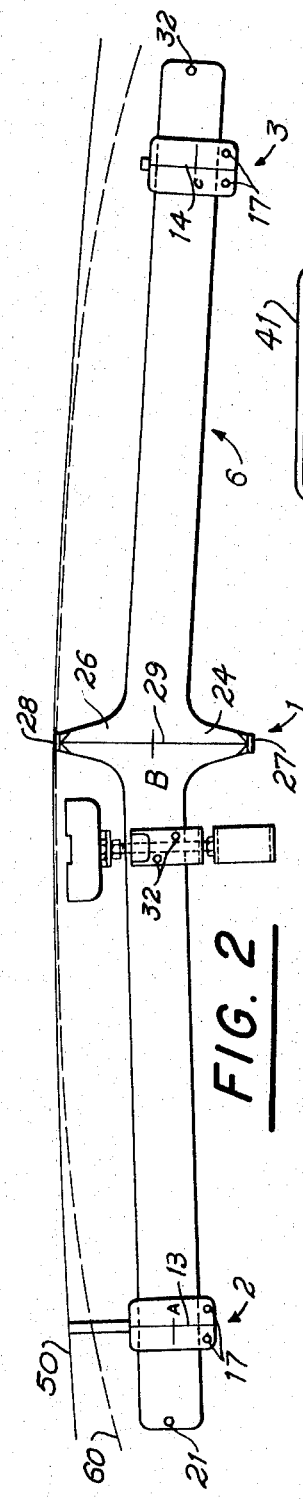
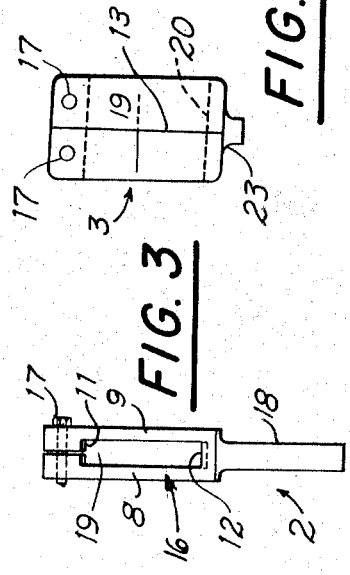
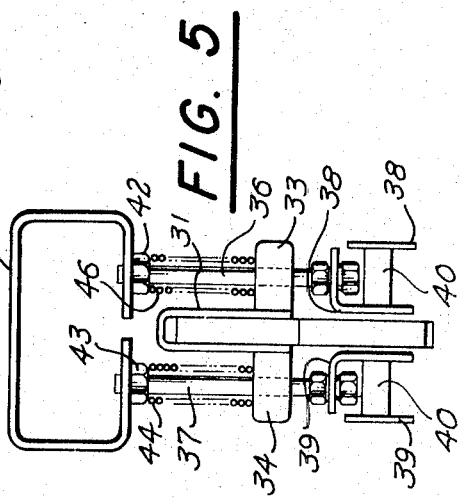
INVENTORS
LAWRENCE S. JUE
ROBERT J. BATMAN
BY DEAN A. HORN
ATTORNEYS United States Patent Office 3,350,786
Patented Nov. 7, 1967

3,350,786
APPARATUS FOR DETERMINING CIRCULARITY OF LARGE DIAMETER OBJECTS
Lawrence S. Jue, San Francisco, and Robert Batman, Cupertino, Calif., and Dean A. Horn, Portsmouth, N.H., assignors to the United States of America as represented by the Secretary of the Navy
Filed Nov. 4, 1965, Ser. No. 506,909
4 Claims. (Cl. 33—178)

ABSTRACT OF THE DISCLOSURE

A gauge is provided for measuring the circularity of submarine hulls and other like objects, the gauge being formed of an elongate bar having two wing portions meeting at a common juncture line and the wings being inclined at a specified angular degree one from the other. At the juncture point of the wings the bar has an outward projection (front foot) of a specified length and, preferably, there are two front feet extending in diametrically opposite directions to permit use of the gauge for measuring both interior and exterior circularities. First and second sliding members are mounted one on each of the wings, the first member having a leg or projection equal in length to the previously-mentioned foot. A magnetic holding device, slidably mounted on one of the wings, holds the gauge against the hull being measured. Hull measurements are made by positioning the center line of the gauge on a fixed 0° point on the hull and slidably setting both slidable members an equal distance from this center line. The gauge is advanced around the circumference of the hull in stepped progressions and at each step measuring the spacing of the second sliding member from the hull circumference. If the circularity is true, this spacing of the other member is consistently the same.

---

The present invention is an invention which relates to circularity determinations and, in particular, to gauges for facilitating the circularity measurement of large diameter objects such as submarine pressure hulls.

As will become apparent, the present invention is particularly concerned with the determination of the circularity of submarine pressure hulls although the gauge provided by the invention is suited for other uses.

Submarine pressure hulls must be absolutely circular within close limits to withstand the external hydrostatic pressure sea. Therefore, newly constructed hulls, as well as repaired hulls, must be carefully measured to verify that design limitations have been met. For example, the "General Specifications for Ships of the U.S. Navy" requires that the contour shall not deviate from the mean circle by more than one-half the thickness of pressure hull plating or one-half inch whichever is lesser. Also, the mean radius of the hull shall not depart from the design radius by more than one-half the thickness of the pressure hull plating or one-half inch whichever is the lesser, and no two radii shall vary more than one-half the thickness of the pressure hull plating within a circumferential distance equal to one-half the lobe length.

Different methods may be employed for measuring hull circularity. For example, one acceptable procedure utilizes a calibrated ring template hung from a fulcrum set on top of a submarine hull. Offsets may then be measured between the hull and the template at 10° stations and these offsets then plotted on polar coordinate paper to represent a contour of the hull section which then must be checked for compliance with the foregoing rules. However, such a method is relatively tedious, expensive and possibly not as accurate as another procedure which utilizes a so-called traverse method which employs a special bridge gauge.

The present invention is an improvement on the particular gauge which has been used in this so-called traverse method. The particular bridge gauge originally employed for the traverse method was a fixed member which had to be especially designed to fit the molded circle of the individual hull being checked, and it was suitable for use only on a submarine hull of a design radius equal to or near the design radius of the fixed gauge. Consequently, individual gauges had to be provided for hulls of different design gauge radii. A number of modern submarine pressure hulls, such as those of the SSN and SSBN classes, are streamlined and tapered so that there is a need for a very large family of fixed bridge gauges to cover the various sections of the hull. For example, on an SSBN, there are as many as 130 circularities to be measuried and each of the circularities is of a different radius.

A primary object of the present invention is, therefore, to provide an improved, more versatile bridge gauge capable of determining the circularity of hulls or objects having widely-varying design gauge radii.

Another important object is to provide a gauge capable of measuring both the inside and outside circularity of a submarine pressure hull.

Other objects and their attendant advantages will become more apparent in the ensuing detailed description.

The preferred embodiment of the invention is illustrated in the accompanying drawings of which:

FIG. 1 is a side elevation of the present bridge gauge in which the gauge is shown resting on hulls of different radii;

FIG. 2 illustrates the same gauge as FIG. 1 except that the disposition of certain members have been reversed to permit the determination of the inside circularity of a hull;

FIGS. 3 and 4 are end and side views of so-called hind and fore foot members, respectively, of the gauge; and FIG. 5 is an end view partially in section of a magnetic holding member which facilitates the desired measurements.

Referring to FIG. 1 of the drawings, the illustrated instrument, which may be called a bridge gauge, is in the form of an elongate bar preferably cut from .375 inch aluminum plate, the bar being formed with central projections which will be termed fore foot member 1. Also, slidably mounted on the bar are a slidable hind foot 2 and a chin member 3. To facilitate description, it also may be considered that the bar has wings 4 and 6 which, more specifically, are longitudinal portions of the bar extending from each end inwardly to fore foot 1. Mounted on wing 4 in close proximity to the fore foot is a magnetic holding device 7.

A particular feature to be noted at this point is that FIG. 1 illustrates whate is known as a 5° gauge in that each of the wings is offset at an angle of 5° to each other. In the manner which will be described, this particular gauge then may be used for measuring hull offsets at 5° station points or segments on the hull. If it were desired to measure offsets at 10° station points, the two wings would be set at 10° to each other. Obviously then the offset angle of the wings is a matter of discretion dependent principally upon the desired number of hull offset measurements.

As best seen in FIG. 3, the bar itself is rectangular in shape having side walls 8 and 9 and parallel upper and lower edges 11 and 12. Foot member 2 and chin member 3 which are slidably mounted on wings 4 and 6, each is scribed with index marks to facilitate the measurements necessary for the circularity determination. More specifically, foot member 2 has a longitudinally extending index mark 13 which, in a manner similar to all of the index marks to be identified is a narrow scribed line most suitably filled with red enamel. Chin member 3 also has a similar longitudinal index mark 14 aligned in the same manner as index mark 13 and, as may be noted from FIG. 2, scribed lines 13 and 14, as well as all other index marks are scribed on both sides of the members. Also, both foot member and chin member 3 have index marks identified by letters A and C, these marks being centered with respect to the bar and being normal to marks 13 and 14, respectively. As will be described, members 2 and 3 are installed on the gauge bar with their scribed lines 13 and 14 parallel to 5° radial lines.

With one exception which will be noted, foot member 2 and chin member 3 may be identically formed so that a description of one member will suffice for an understanding of the other. Considering FIG. 3, it may be noted that foot member 2 has a split upper portion 16 secured together by a cap screw 17 and a rod-like projection 18 extending downwardly (FIG. 1) from the rectilinear upper portion 16. To permit the desired sliding of the member on the bar, upper portion 16 is formed with a slot, identified by numeral 19 (FIG. 4) and the upper and lower walls of this slot are inclined at an angle of 2½° to permit the member to be mounted on the bar with inscribed line 13 (or 14) parallel to a 5° radial line. Five degree radial lines are those lines extending from the center of the circular object being measured and dividing the circumference into five degree chords. Since, as has been noted, the wings are disposed at a total angle of five degrees, each wing is at an angle of two and one half degrees from a horizontal plane. The inclination of the slots thus cants the foot and chin members an additional two and a half degrees to dispose scribed lines 13 and 14 at angles of five degrees which then will be parallel to or can be aligned with the five degree radial lines. The use of the split upper portion enables the frictional engagement of the member on the bar to be adjusted. As also may be noted, the bar mounts a pair of screw stops 21 and 22 which prevent the members from accidentally sliding off the end of the bar.

The sole different between hind foot member 2 of FIG. 3 and chin member 3 of FIG. 4 lies in the length of the rod-like projection. Thus, in a particular 50 gauge used in measuring submarine hulls, rod-like projection 18 in FIG. 3 is formed of such a length that the distance from a lower wall 20 of its slot 19 to its tip is two inches with a tolerance of ±.001 of an inch. By the way of comparison, the length of rod-like projection 23 of chin member (FIG. 4) is one half of an inch with the same tolerance.

Fore foot member 1 preferably is formed of a pair of flanges 24 and 26 which, as will be seen, project upwardly and downwardly respectively from upper and lower edges 11 and 12 of the bar. Most suitably, the tips of the flanges are provided with special contact pieces 27 and 28 which are precisely-formed commercially obtainable members and which fit into tapped portions of the flanges and are further secured by a strong bonding agent. If desired, rods 18 and 23 of FIGS. 3 and 4, also may be specially formed contact members secured at their upper ends to their respective members.

Further considering fore foot 1, it is to be particularly noted that flanges 24 and 26 project outwardly a distance equal to the outward projection of rod 18 of hind foot 2. Thus, in the previously-mentioned example, flange 24 and 26 project outwardly from upper or lower edges 11 and 12 of the bar a distance of 2 inches. A further important feature is that fore foot 1 has a scribed index mark 29 centered longitudinally of the member and a second scribed index mark B also centered on the bar and extending normal to index mark 29. As would be surmised, these marks, as well as the others, provide reference points for the measurements which determine circularity.

Magnetic holding member 7 is employed to firmly hold the gauge against the pressure hull to free the operator of this task. Referring to FIG. 5, the magnetic grip is formed of a U-shaped frame 31 that fits closely over the gauge bar and is secured to the bar by cap screws 32 (FIG. 1). Since, as will be explained, the grip is one of the members that has to be reversed to permit circularity determinations of the inside of a pressure hull (FIG. 2), the bar should be provided with four cap screw holes, two of which will receive the cap screw during the FIG. 1 operation and the other two during the FIG. 2 operation. The mounting of the frame on the gauge bar is so arranged that the center line of the magnetic grip is parallel to a 5° radial line.

Further considering details of the magnetic grip, frame 31 rigidly carries support members 33 and 34 through which extend magnet-carrying arms 36 and 37, the lower portion of these arms securely carrying ferrous pole pieces 38 and 39 which, in turn, carry permanent magnets 40. The upper ends or rods 36 and 37 support frame 41, bolts 42 and 43 being employed for this purpose. Coil springs 44 and 46 bear against bolts 42 and 43 and urge the rods upwardly (FIG. 5), the arrangement being one in which the springs hold the magnets in a backed-off position until the gauge is positioned next to the pressure hull.

The manner in which the present gauge is used will be described with reference to FIGS. 1 and 2. In FIG. 1, the gauge is shown resting on what may be considered as the outside surface 50 of a 33-foot diameter pressure hull, it also being noted in this figure that a dotted line 60 represents a 16 foot diameter pressure hull. In actual practice, the particular 5° gauge which has been described is capable of accurately determining circularities of pressure hulls varying from about 15-foot diameter to 35-foot diameter. In determining the circularity of the 33-foot diameter hull, it first is necessary to calculate the chord length for the 5° gauge for this particular design hull radius. Next, hind foot 2 is set at a particular chord length distance from fore foot 1 corresponding to the calculated chord length so that the tip end of its scribed line 13 is space from the tip end of scribed line 29 a distance precisely equal to the chord length. The index marks A and B of these members facilitate and permit a precise fixing of this distance. When hind foot member 2 has been precisely positioned, its cap screws 17 may be tightened to securely fix the member. In a similar member, chin member 3 is precisely fixed at the same chord distance from index mark B of the fore foot, this distance again corresponding to the chord length for the 5° gauge which was originally calculated. The gauge then may be placed on the hull and offset measurements commence. Hind foot 2 is placed on the 0° station of the hull and the offset distance of index mark C of the chin member then measured, this offset distance being the distance from point C to the pressure hull. Obviously, if the hull circularity is precise, this offset distance of point C from the hull will be equal to the offset distance of point A of the hind foot of the hull surface. Variations in this particular distance accurately determine variations in hull circularity. In making the offset measurements, appropriate instruments such as a telescopic gauge may be used to obtain accurate measurements which then may be read with a micrometer or similar instrument and the reading recorded. Before the next step is commenced, it is desirable to mark the position of fore foot 1 on the hull and this marking can be made to coincide with index mark 29 of the fore foot. The gauge then is advanced to place index line 13 on the previous position of fore foot 1 and another offset measurement taken. By progressing the gauge in these 5° segments or stations around the circumference of the hull complete circularity data is obtained. In obtaining the data, care should be taken to assure that the plane of the bridge gauge is held square with the hull. Magnetic gripping member 7 when properly mounted in the described manner on the gauge bar should assure the proper disposition of gauge with respect to the hull.

It also is possible to ascertain the circularity by employing a computer to calculate the hull section contour directly from the offset measurements. In practice, a computer has been programmed to prepare a report giving the station number, actual offset measurements as well as any radius vectors that exceed the average radius by the allowable tolerance. This particular computer method is advantageous since it can perform the calculations and provide the answers in thirty seconds or less. Otherwise, it may be necessary to make actual plots on a mold loft floor or the like and compare the plot obtained from the offset measurements against a true circle representing the actual design hull radius.

Referring again to FIG. 1 the dotted line represents a 16-foot diameter pressure hull and, as will be apparent hind foot 2 and chin member 3 can be repositioned to conform to the smaller five degree cord length. When repositioned the procedure is precisely the same as that previously described.

FIG. 2 illustrates the manner in which the gauge is used to determine circularity of inside surfaces of the pressure hull. The manner in which the determinations is made are precisely the same as that already described although, as may be noted, the positions of hind foot 2, magnetic grip 7 and chin member 3 have been reversed. The manner in which these members may be reversed so as to project in the opposite direction from that shown in FIG. 1 should be apparent from the foregoing description.

The principal advantage of the present gauge lies in its versatility which not only permits it to be used on hulls of widely varying design radius, but also to be employed both for the outer surface determinations as well as the inner surface. In particular, and as has been noted previously, tapered submarine hulls such as the SSBN class, have as many as 130 circularities to be measured and, assuming the use of the older-type fixed gauge previously described, about 130 such gauges would have to be provided for this single operation. By using the universal gauge of the present invention, only one gauge is required. Also, the particular arrangement of the index marks assures accuracy of the measurements.

Obviously many modifications and variations of the present invention are possible in the light of the above teachings. It is therefore to be understood that within the scope of the appended claims the invention may be practiced otherwise than as specifically described.

What is claimed is:
1. A bridge gauge for use in determining circularity of large diameter objects comprising;
    an elongate bar formed of a pair of longitudinally-extending wing portions meeting medially of the bar at a common junction and having longitudinal axes which are inclined from each other at a particular predetermined angle,
    a hind foot member slidingly adjustable longitudinal along one of said wings,
    a chin member slidingly adjustable longitudinal along the other wing,
    a fore foot member having an object-contacting projecting portion extending outwardly from said bar at said common junction of said wings,
    said hind foot member also having an object-contacting projecting portion co-extensive with said fore foot projection, and
    said members each bearing measurement indicia providing reference points for determinging the distance between said hind foot and fore foot members and between the fore foot and chin members respectively and, when said bar is placed on said object, the offset distance between said chin member and the surface of the object, said indicia on each said member comprising a line through said reference point and disposed at an angle equal to the complement of one-half said predetermined angle with respect to the longitudinal axes of said wing portions.

2. The gauge of claim 1 wherein said hind foot and chin members each are provided with a gauge bar-receiving slot and each of said slots is inclined from a side of the member at a particular angle dependent upon the angle at which said wings are inclined from each other.

3. The gauge of claim 2 wherein said fore foot member has a pair of co-extensive object-contacting projecting portions extending outwardly from said bar in opposite directions whereby said slidable members can be reversed in position and said gauge used for determining the circularity of both the inside and outside surfaces of said object.

4. The gauge of claim 3 further including magnetic holding means mounted on one of said wings between said hind and fore foot members for holding said foot members in close contact with the object being measured.

References Cited

UNITED STATES PATENTS

| 2,365,353 | 12/1944 | Morris | 33—178 X |
| 2,572,999 | 10/1951 | Elliott | 33—178 |
| 3,169,323 | 2/1965 | Hold | 33—178 X |

FOREIGN PATENTS

| 897,915 | 6/1944 | France. |
| 295,114 | 2/1954 | Switzerland. |

SAMUEL S. MATTHEWS, *Primary Examiner.*